United States Patent
Hofhansl

(10) Patent No.: US 10,733,148 B2
(45) Date of Patent: Aug. 4, 2020

(54) PREDICATE BASED DATA DELETION

(71) Applicant: salesforce.com, inc., San Francisco, CA (US)

(72) Inventor: Lars Hofhansl, Orinda, CA (US)

(73) Assignee: salesforce.com, inc., San Francisco, CA (US)

( * ) Notice: Subject to any disclaimer, the term of this patent is extended or adjusted under 35 U.S.C. 154(b) by 283 days.

(21) Appl. No.: 15/452,390

(22) Filed: Mar. 7, 2017

(65) Prior Publication Data

US 2018/0260407 A1  Sep. 13, 2018

(51) Int. Cl.
G06F 17/30 (2006.01)
G06F 16/174 (2019.01)
G06F 16/16 (2019.01)
G06F 16/21 (2019.01)

(52) U.S. Cl.
CPC ........ G06F 16/1744 (2019.01); G06F 16/162 (2019.01); G06F 16/21 (2019.01)

(58) Field of Classification Search
CPC ..... G06F 16/1744; G06F 16/21; G06F 16/162
See application file for complete search history.

(56) References Cited

U.S. PATENT DOCUMENTS

| | | | | |
|---|---|---|---|---|
| 8,504,758 B1* | 8/2013 | McHugh | ............... | G06F 3/0608 711/100 |
| 2006/0200374 A1* | 9/2006 | Nelken | ............... | G06Q 10/109 705/7.19 |
| 2012/0246129 A1* | 9/2012 | Rothschild | ............... | G06F 16/13 707/693 |
| 2014/0095775 A1* | 4/2014 | Talagala | ............... | G06F 12/0866 711/103 |
| 2014/0325115 A1* | 10/2014 | Ramsundar | ......... | G06F 12/0238 711/102 |
| 2015/0120656 A1* | 4/2015 | Ramnarayanan | ..... | G06F 16/219 707/616 |
| 2015/0120684 A1* | 4/2015 | Bawaskar | ............. | G06F 16/137 707/693 |
| 2016/0077936 A1* | 3/2016 | Tang | ................... | G06F 11/2028 714/4.11 |
| 2016/0154866 A1* | 6/2016 | Teletia | .................. | G06F 16/258 707/687 |
| 2016/0371291 A1* | 12/2016 | Shamis | ............... | G06F 16/1744 |
| 2016/0380913 A1* | 12/2016 | Morgan | .................. | H04L 41/12 709/226 |
| 2017/0031959 A1* | 2/2017 | Zayas | ................. | G06F 16/1727 |

* cited by examiner

Primary Examiner — Jeff A Burke
Assistant Examiner — Fernando M. Mari
(74) Attorney, Agent, or Firm — Holland & Hart LLP

(57) ABSTRACT

A database may delete rows of data based on one or more predicate parameters. A method of data storage includes receiving a delete request for a database, where the delete request includes one or more predicate parameters and adding the predicate parameters to a set of deletion predicate parameters in metadata of the database. The method may further include performing a compaction of the database, where the compaction includes rewriting each data element of the database unless a key of the data element corresponds to at least one of the set of deletion predicate parameters.

19 Claims, 9 Drawing Sheets

PREDICATE BASED DATA DELETION

FIELD OF TECHNOLOGY

The present disclosure relates generally to database systems and data processing, and more specifically to predicate based data deletion.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may include a system of one or more databases to store data processed by the platform. The database system may be configured to store a large number of rows of data (e.g., millions or billions of rows). The database system may delete data by individually marking each row to be deleted with a delete marker. The process of writing a delete marker to each row to be deleted may consume a large amount of database resources and result in inefficient operation of the database system.

DETAILED DESCRIPTION

A database system may be configured to store large amounts of data (e.g., millions or billions of rows). In some cases, the database system may be configured to delete rows of data by first marking them with a delete marker (e.g., a tombstone marker) and then later rewriting all the data rows except those marked with a delete maker. For example, the database system may mark all the data belonging to a particular tenant with a delete marker and then not rewrite these rows during a compaction process. In some cases, when the dataset to be deleted is large, writing individual delete markers to each row to be deleted may consume a proportionately large amount of time and processing resources.

In accordance with aspects of the present disclosure, the database system may be configured to delete data based on some parameter or identifier of the data in each row. For example, instead of first writing a delete marker and then later deleting rows having a delete marker, the database system may be configured to check each row for some parameter or identifier stored as a deletion predicate parameter, and delete only the rows that include the deletion predicate parameter. The parameter may be some identifying characteristic of the data itself (e.g., an owner of the data) instead of a parameter that is later added by the system (e.g., a delete marker). Deleting data in this way may reduce the time and processing resources needed to write a delete marker in each row to be deleted, thereby increasing the efficiency of the database system.

Aspects of the disclosure are initially described in the context of an environment supporting predicate based deletion. A database compaction process that supports predicate based data deletion is then described. Aspects of the disclosure are further illustrated by and described with reference to apparatus diagrams, system diagrams, and flowcharts that relate to predicate based data deletion.

Figure 1:
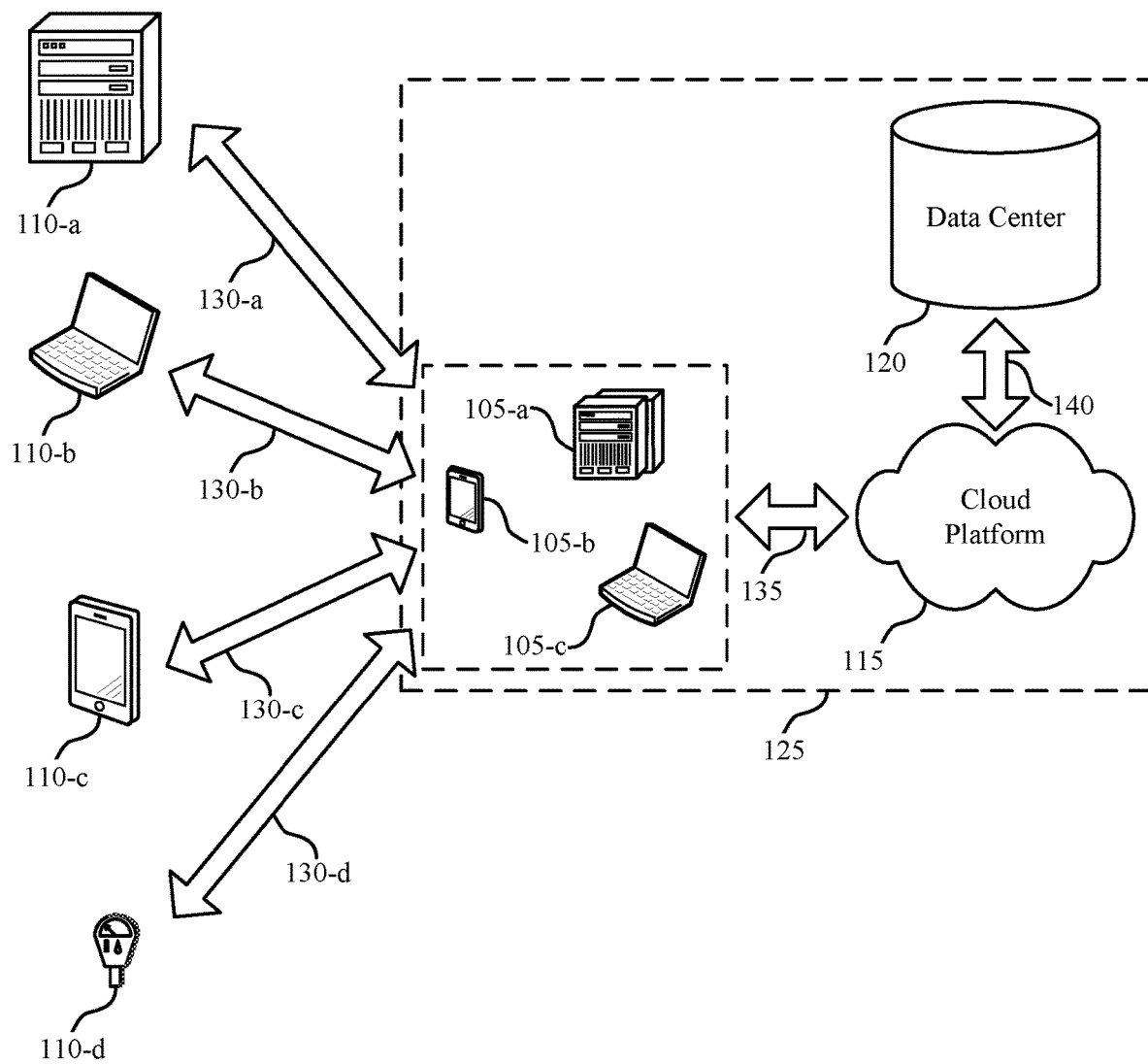
FIG. 1 illustrates an example of an environment for data storage that supports predicate based data deletion in accordance with aspects of the present disclosure.

FIG. 1 illustrates an example of an environment 100 for cloud computing that supports predicate based data deletion in accordance with various aspects of the present disclosure. The environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-toconsumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

System 125 may include cloud clients 105, cloud platform 115, and data center 120. In some cases, data processing may occur at any of the components of system 125, or at a combination of these components. In some cases, servers may perform the data processing. The servers may be a cloud client 105 or located at data center 120.

In some cases, data center 120 may include an HBase database. An HBase database may be configured to use a log-structured merge-tree (LSM tree) architecture to store data, and may aperiodically perform compaction or merge processes to rewrite data to larger files. During a compaction process, HBase may be configured to write a delete marker to a key of each row to be deleted and then not rewrite data that is marked by a delete marker.

In accordance with aspects of the present disclosure, an HBase database may be configured to implement predicate based data deletion. The predicate for deletion may be based on a predicate parameter. For example, the predicate parameter may indicate a specific cloud client 105 (e.g., a particular tenant in a multi-tenant database system). If the predicate parameter is included in a set of deletion predicate parameters stored in the HBase, the HBase may delete any rows of data that include the predicate parameter (e.g. all rows of data associated with a particular tenant).

Deleting data in this way may save the processing time and data resources required to write a delete marker for each row of data to be deleted. Instead, during the compaction process, HBase may compare any predicate parameters associated with a row of data to a set of deletion predicate parameters, and may refrain from rewriting any row of data with predicate parameters included or indicated by the set of deletion predicate parameters.

Figure 2:
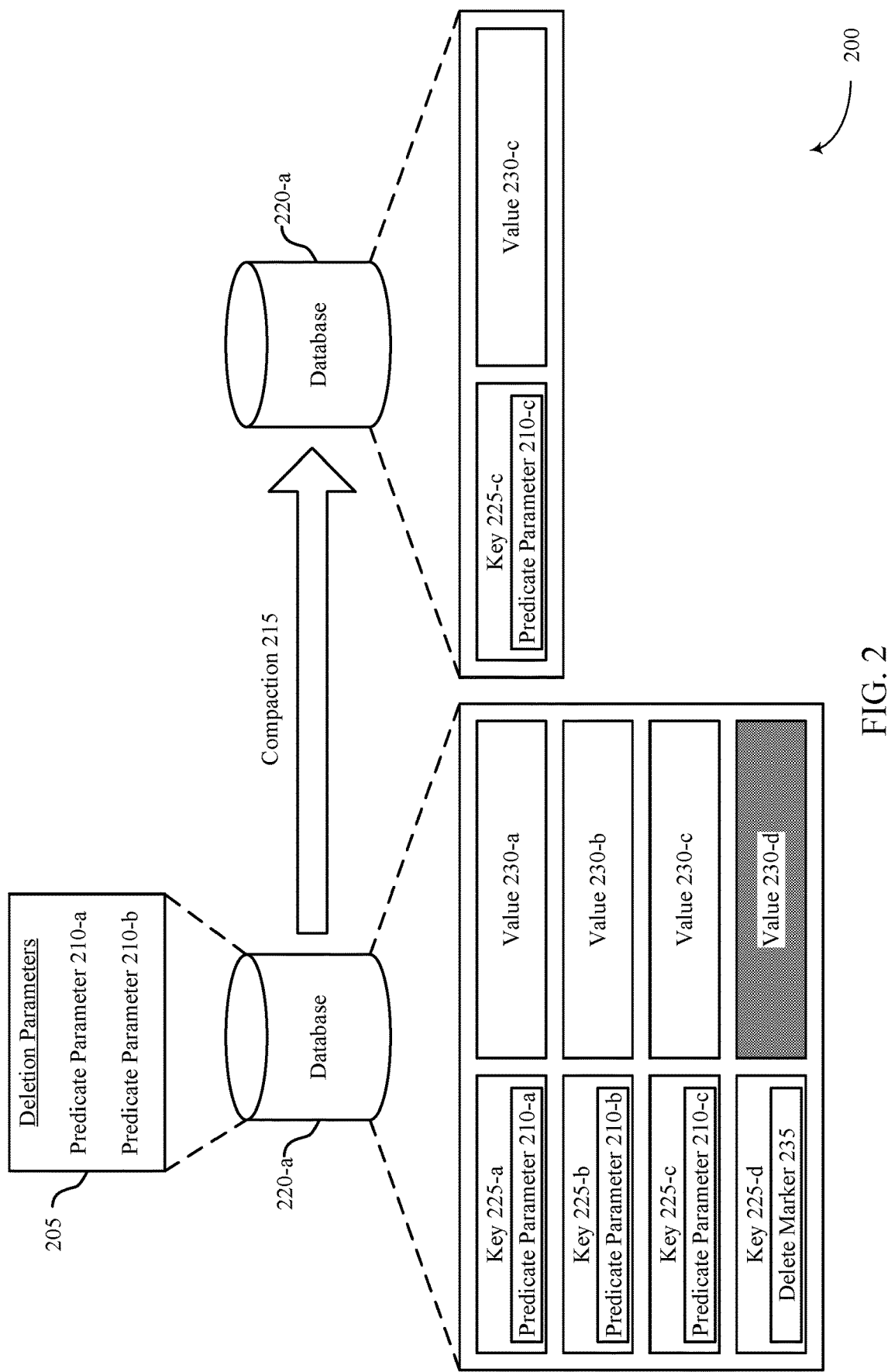
FIG. 2 illustrates an example of a database compaction process that supports predicate based data deletion in accordance with aspects of the present disclosure.

FIG. 2 illustrates an example of a database compaction process 200 that supports predicate based data deletion in accordance with various aspects of the present disclosure. The data compaction process 200 may include a database 220-*a*, which may be an example of a component of data center 120, as described with reference to FIG. 1. The database compaction process 200 illustrates portions of data stored at database 220-*a* before and after a compaction process 215. Database 220-*a* may utilize predicate based data deletion during the compaction process 215 to recover data storage resources.

A database 220 may implement predicate based deletion. Database 220-*a* (e.g., a distributed database, such as HBase) may use an LSM tree architecture and write-ahead logging (WAL). Database 220-*a* may store data in rows as key-value pairs. Database 220-*a* may receive instructions to delete multiple rows of data (i.e., a delete request) based on a common predicate parameter 210. A predicate parameter 210 may be an example of an organization identifier, a data size identifier, a data owner identifier, a version identifier, or any other parameter that identifies an aspect of the data.

For a row of data, the key 225 of a key-value pair may include one or more predicate parameters 210. In some cases, the one or more predicate parameters 210 may be stored in metadata associated with the row of data. A predicate parameter 210 may already be present in the data before or at the time the data is written to database 220-*a*. For example, the data may include a predicate parameter 210 indicating a tenant associated with the data, which may be present in the data when the data is sent to database 220-*a* (e.g., from the tenant) and before the data is written to database 220-*a*.

Database 220-*a* may delete data based on a set of deletion predicate parameters 205. Based on the received instructions including a common predicate parameter 210, database 220-*a* may add the common predicate parameter 210 to a set of deletion predicate parameters 205. The set of deletion predicate parameters 205 may be stored in metadata of database 220-*a*. In some cases, the set of deletion predicate parameters 205 may include one or more specific values of predicate parameters 210. In these cases, the specific values of the predicate parameters 210 may indicate for database 220-*a* to delete any row of data associated with a predicate parameter 210 equal to the specific value. For example, if an identifier for a specific organization is included in the set of deletion predicate parameters 205, database 220-*a* may delete any row of data associated with the specific organization identifier.

In other cases, the set of deletion predicate parameters 205 may include one or more logical statements related to one or more predicate parameters 210. In one example, a logical statement may indicate for database 220-*a* to delete any row of data with an organization identifier equal to a specified organization identifier. In another example, a logical statement may indicate for database 220-*a* to delete any row of data with a data owner identifier equal to a specified data owner identifier and a version identifier greater than a specified version identifier value.

Database 220-*a* may perform a compaction process 215 based on the set of deletion predicate parameters 205. During the compaction process 215, database 220-*a* may process multiple rows of data, which in some cases may be organized in key-value pairs, and rewrite the rows of data into a different file. Database 220-*a* may determine whether to rewrite a row of data during the compaction process 215 based on the set of deletion predicate parameters 205. For example, database 220-*a* may identify the one or more predicate parameters 210 within the key 225 of the row of data, and may compare the identified one or more predicate parameters 210 to the set of deletion predicate parameters 205. If the set of deletion predicate parameters 205 includes or indicates one of the identified one or more predicate parameters 210, database 220-*a* may not rewrite the row of data during the compaction process 215. In this way, the row of data not rewritten may be overwritten with other data during or following the compaction process 215. In some cases, "deleting" a row of data may refer to this process of not rewriting the row of data during a compaction process 215.

A predicate parameter 210 or logical statement may be removed from the set of deletion predicate parameters 205. In one case, database 220-*a* may receive instructions from a user to remove a specific predicate parameter 210 or logical statement from the set of deletion predicate parameters 205. In another case, during a compaction process 215, database 220-*a* may determine if any data rows were not rewritten to a different file based on a specific predicate parameter 210 or logical statement of the set of deletion predicate parameters 205. If, during the compaction process 215, database 220-*a* determines a specific predicate parameter 210 or logical statement of the set of deletion predicate parameters 205 does not include or indicate any rows of data, database 220-*a* may remove the specific predicate parameter 210 or logical statement from the set of deletion predicate parameters 205.

In some cases, database 220-*a* may implement marker based deletion along with predicate based deletion. Database 220-*a* may mark data for deletion, in some cases due to a user input. For example, a row of data may have a delete marker 235 written to it. The delete marker 235 may also be referred to as a tombstone marker. In some cases, the delete marker 235 may specify a key 225 of a key-value pair in database 220-*a*. Database 220-*a* may periodically or aperiodically compact the data stored in database 220-*a*. During the compaction process 215, database 220-*a* may not rewrite a row of data marked with a delete marker 235.

In some cases, database 220-*a* may implement time-to-live (TTL) based deletion along with predicate based deletion. Database 220-*a* may store a TTL value, which in some cases may be specified by a user. Database 220-*a* may utilize the TTL value to delete data during a compaction process 215. For example, database 220-*a* may identify a timestamp associated with a row of data, and may determine an amount of time that has passed since the timestamp. Database 220-*a* may compare the amount of time that has passed since the timestamp with the TTL value. If the amount of time that has passed since the timestamp is greater than the TTL value, database 220-*a* may not rewrite the row of data during the compaction process 215.

Data retrieval from database 220-*a* may be affected by the set of deletion predicate parameters 205. A user may request to retrieve a row of data (e.g., the value 230 of a key-value pair) from database 220-*a*. In some cases, a predicate parameter 210 within the key 225 of the key-value pair may be included in or indicated by the set of deletion predicate parameters 205. In these cases, database 220-*a* may determine whether to surface the value 230 of the key-value pair to the user. In some cases, database 220-*a* may surface the value 230 to the user, and in other cases, database 220-*a* may not surface the value 230 to the user. The determination of whether to surface the value 230 of the key-value pair to the user may be based on, for example, a predicate parameter 210, a user input preference, or an aspect of database 220-*a*. In other cases, a delete marker 235 may indicate the key 225 of the key-value pair. In these cases, the value 230 of the key-value pair may be masked by the delete marker 235. Based on the delete marker 235, database 220-*a* may not surface the value 230 of the key-value pair to the user. In yet other cases, the key 225 of the key-value pair may include a timestamp, where the amount of time that has passed since the timestamp is greater than a TTL value. In these cases, database 220-*a* may surface the value 230 of the key-value pair to the user without comparing the amount of time that has passed since the timestamp with the TTL value.

Predicate based data deletion, as opposed to marker based deletion, may reduce or avoid overhead and increases efficiency associated with a compaction process of a database. For example, writing delete markers 235 to each row of data that is to be deleted takes both processing time and data storage space. Predicate based data deletion skips this step by basing deletion on parameters already present in a row of data. Additionally, each delete marker 235 applies to a single key-value pair. A predicate parameter 210 may apply to multiple key-value pairs that contain a common predicate parameter 210. Predicate based deletion also allows for deletion to be based on many different predicate parameters 210, as opposed to just the TTL value of TTL based deletion.

In one example, database 220-*a* (e.g., HBase) may receive a delete request including a predicate parameter 210 (e.g., predicate parameter 210-*b*). Predicate parameter 210-*b* may be a specific tenant, and the delete request may indicate for database 220-*a* to delete all data associated with the specific tenant (e.g., the tenant may no longer be a client of a user associated with database 220-*a*). Database 220-*a* may add an identifier of the specific tenant to a set of deletion predicate parameters 205. The identifier of the specific tenant may also be referred to as an organization identifier. In some cases, the set of deletion predicate parameters 205 may already contain an identifier of a different specific tenant (e.g., predicate parameter 210-*a* may indicate the different specific tenant).

Database 220-*a* may contain multiple rows of data stored as key-value pairs. For example, database 220-*a* may contain at least four rows of data. A first row may contain key 225-*a*, which includes predicate parameter 210-*a*, and value 230-*a*. A second row may contain key 225-*b*, which includes predicate parameter 210-*b*, and value 230-*b*. A third row may contain key 225-*c*, which includes predicate parameter 210-*c*, and value 230-*c*. A fourth row may contain key 225-*d* and value 230-*d*. In one case, database 220-*a* may receive a delete request, where the delete request indicates the data stored in the fourth row. Database 220-*a* may write a delete marker 235 to key 225-*d* in the fourth row based on the delete request. The delete marker 235 may mask value 230-*d* in the fourth row. In this case, if a user requests the data stored in the fourth row, database 220-*a* may not send any data to the user due to the delete marker 235 and the masked value 230-*d*.

Database 220-*a* may undergo a compaction process 215. Database 220-*a* may read each row of data, and may identify any predicate parameters 210 contained in a key 225 of each row of data. For example, database 220-*a* may identify predicate parameter 210-*a* in key 225-*a*. Database 220-*a* may determine whether the identified predicate parameter 210-*a* is contained in the set of deletion predicate parameters 205. Database 220-*a* may determine that predicate parameter 210-*a* is contained in the set of deletion predicate parameters 205, and may refrain from rewriting the row of data including key 225-*a* and value 230-*a* based on the determination.

Similarly, for key 225-*b* and its predicate parameter 210-*b*, database 220-*a* may not rewrite the row of data with key 225-*b* and value 230-*b* based on determining that predicate parameter 210-*b* is contained in the set of deletion predicate parameters 205. In some cases, database 220-*a* may identify that a predicate parameter 210 is not included or indicated in the set of deletion predicate parameters 205. For example, database 220-*a* may determine that predicate parameter 210-*c*, included in key 225-*c*, is not included or indicated in the set of deletion predicate parameters 205, and may rewrite the row of data including key 225-*c* and value 230-*c* to a file in database 220-*a*.

In other cases, database 220-*a* may determine a key 225 includes a delete marker 235, such as key 225-*d*. Database 220-*a* may not rewrite the row of data including key 225-*d* and value 230-*d* during the compaction process 215 based on the delete marker 235. Either during the compaction process 215 or at a later time, as more data is written to database 220-*a*, data may be written over the rows of data that were not rewritten.

Figure 3:
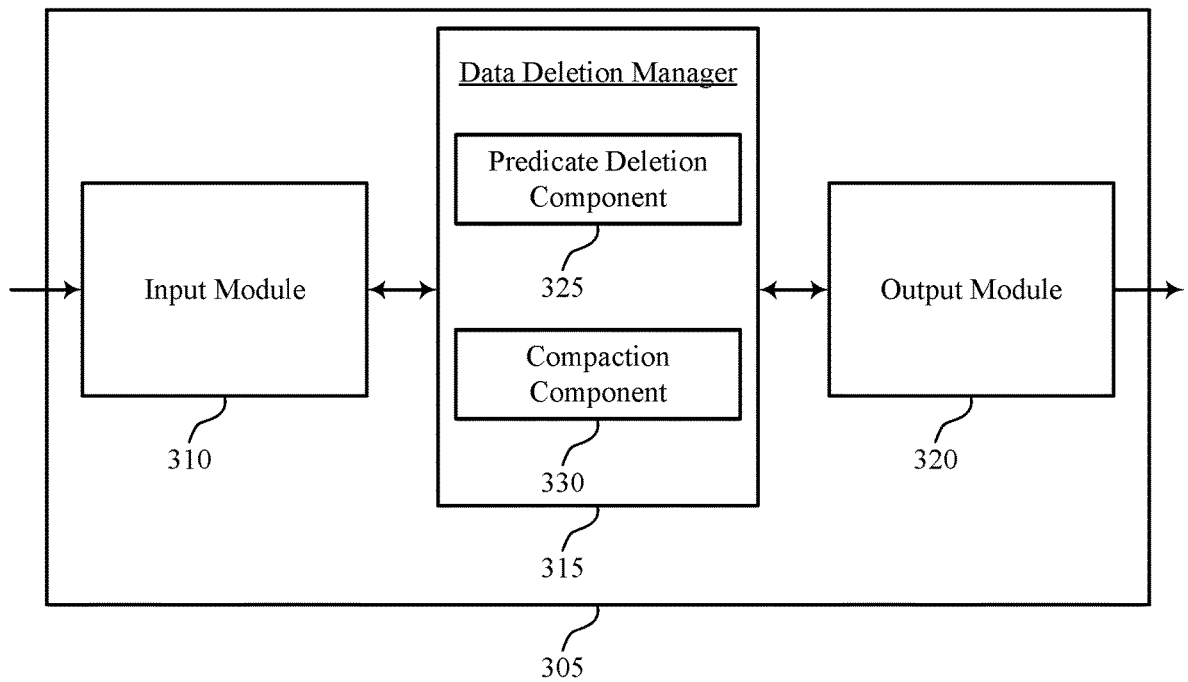
FIG. 3 illustrates a block diagram of a system that supports predicate based data deletion in accordance with aspects of the present disclosure.

FIG. 3 shows a block diagram 300 of a system 305 that supports predicate based data deletion in accordance with various aspects of the present disclosure. System 305 may include input module 310, data deletion manager 315, and output module 320. System 305 may also include a processor. Each of these components may be in communication with one another (e.g., via one or more buses). In some cases, system 305 may be an example of a user terminal, a database server, or a system containing multiple computing devices. Data deletion manager 315 may be an example of aspects of the data deletion manager 515 described with reference to FIG. 5. Data deletion manager 315 may also include predicate deletion component 325 and compaction component 330.

Data deletion manager 315 and/or at least some of its various sub-components may be implemented in hardware, software executed by a processor, firmware, or any combination thereof. If implemented in software executed by a processor, the functions of the data deletion manager 315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The data deletion manager 315 and/or at least some of its various sub-components may be physically located at various positions, including being distributed such that portions of functions are implemented at different physical locations by one or more physical devices. In some examples, data deletion manager 315 and/or at least some of its various sub-components may be a separate and distinct component in accordance with various aspects of the present disclosure. In other examples, data deletion manager 315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Predicate deletion component 325 may receive a delete request for a database, where the delete request includes one or more predicate parameters, add the one or more predicate parameters to a set of deletion predicate parameters in metadata of the database, and refrain from writing a delete marker for the delete request based on the delete request including the one or more predicate parameters. In some cases, the one or more predicate parameters corresponds to a data element in the database at the time the data element is initially written to the database. In some cases, each of the one or more predicate parameters is associated with a set of data elements of the database. In some cases, the one or more predicate parameters may include an organization identifier, a data size identifier, a data owner identifier, a version identifier, or a combination thereof. In some cases, the database is structured in a log-structured merge-tree format. In some cases, the database includes a WAL database.

Compaction component 330 may perform a compaction of the database, where the compaction includes rewriting each data element of the database unless a key of the data element corresponds to at least one of the set of deletion predicate parameters. In some cases, the compaction includes rewriting each data element of the database unless a key of the data element corresponds to at least one of the set of deletion predicate parameters, unless the data element is marked with a delete marker, or unless a threshold time indicated by a TTL value has passed since a timestamp of the data element.

Figure 4:
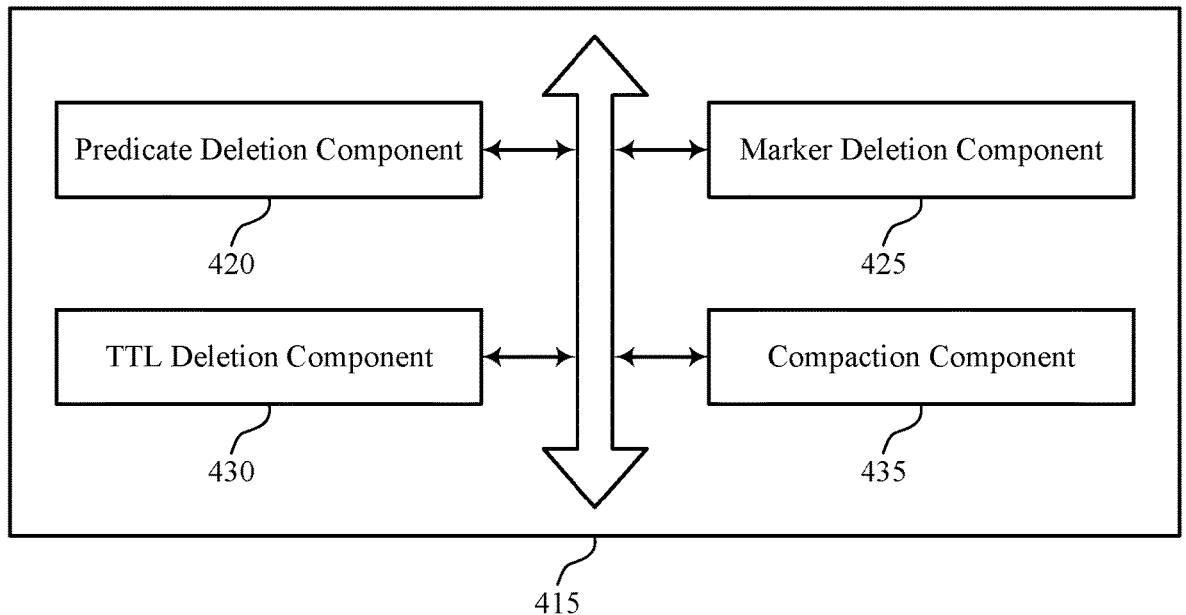
FIG. 4 illustrates a block diagram of a data deletion manager that supports predicate based data deletion in accordance with aspects of the present disclosure.

FIG. 4 shows a block diagram 400 of a data deletion manager 415 that supports predicate based data deletion in accordance with various aspects of the present disclosure. The data deletion manager 415 may be an example of aspects of a data deletion manager 315 or 515 described with reference to FIGS. 3 and 5. The data deletion manager 415 may include predicate deletion component 420, marker deletion component 425, TTL deletion component 430, and compaction component 435. Each of these modules may communicate, directly or indirectly, with one another (e.g., via one or more buses).

Predicate deletion component 420 may receive a delete request for a database, where the delete request includes one or more predicate parameters, add the one or more predicate parameters to a set of deletion predicate parameters in metadata of the database, and refrain from writing a delete marker for the delete request based on the delete request including the one or more predicate parameters. In some cases, the one or more predicate parameters corresponds to a data element in the database at the time the data element is initially written to the database. In some cases, each of the one or more predicate parameters is associated with a set of data elements of the database. In some cases, the one or more predicate parameters may include an organization identifier, a data size identifier, a data owner identifier, a version identifier, or a combination thereof. In some cases, the database is structured in a log-structured merge-tree format. In some cases, the database includes a WAL database.

Marker deletion component 425 may receive a subsequent delete request for the database, where the subsequent delete request includes an identifier for a data element and write a delete marker in line with the data element associated with the identifier.

TTL deletion component 430 may receive a subsequent delete request for the database, where the subsequent delete request includes a TTL value.

Compaction component 435 may perform a compaction of the database, where the compaction includes rewriting each data element of the database unless a key of the data element corresponds to at least one of the set of deletion predicate parameters. In some cases, the compaction includes rewriting each data element of the database unless a key of the data element corresponds to at least one of the set of deletion predicate parameters, unless the data element is marked with a delete marker, or unless a threshold time indicated by a TTL value has passed since a timestamp of the data element.

Figure 5:
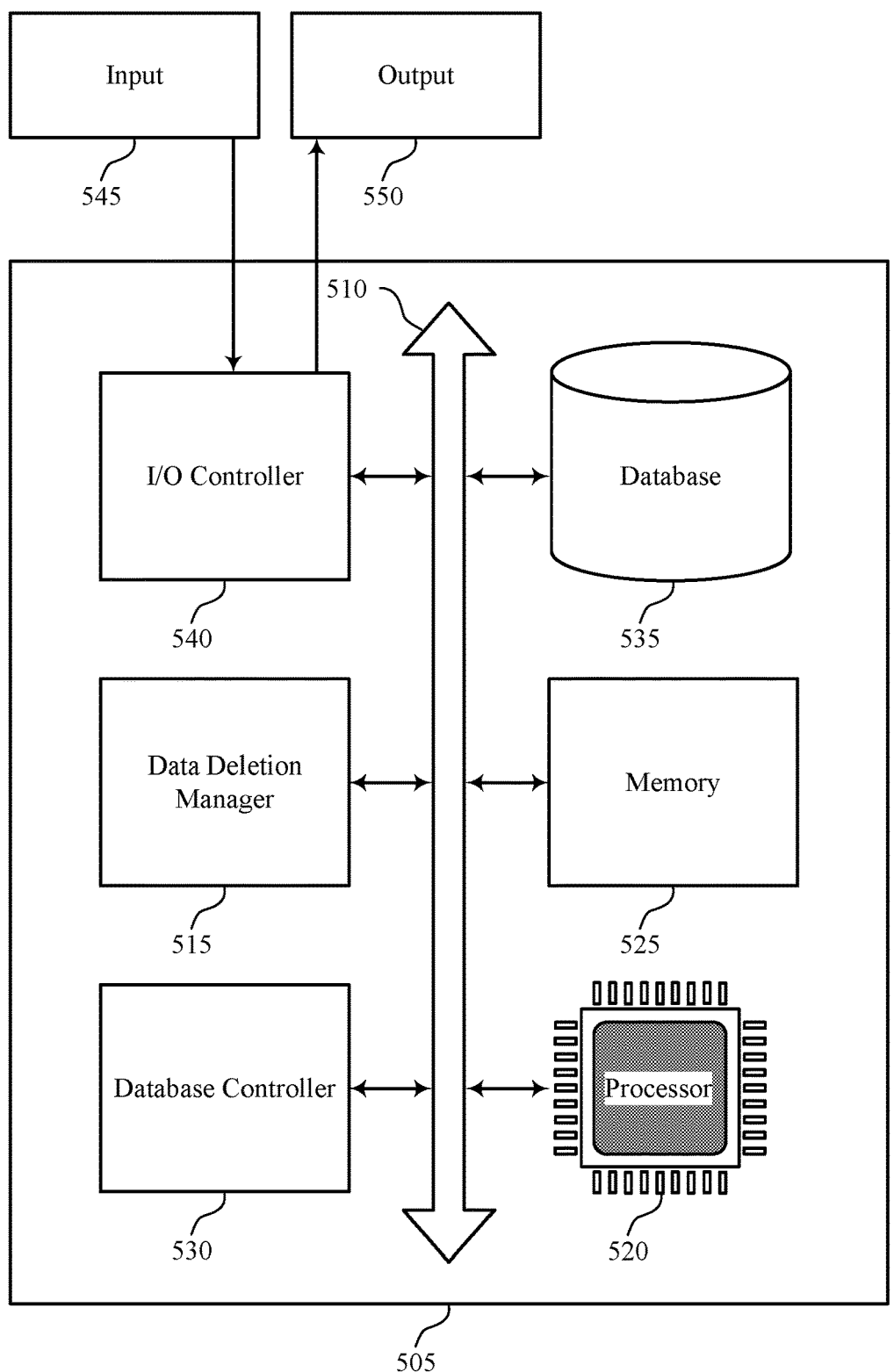
FIG. 5 illustrates a block diagram of an environment including a data deletion manager that supports predicate based data deletion in accordance with aspects of the present disclosure.

FIG. 5 shows a diagram of an environment 500 including a system 505 that supports predicate based data deletion in accordance with various aspects of the present disclosure. System 505 may be an example of or include the components of system 125 as described above, e.g., with reference to FIG. 1. System 505 may include components for bi-directional data communications including components for transmitting and receiving communications, including data deletion manager 515, processor 520, memory 525, database controller 530, database 535, and I/O controller 540. These components may be in electronic communication via one or more busses (e.g., bus 510).

Processor 520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 520 may be configured to operate a memory array using a memory controller. In other cases, a memory controller may be integrated into processor 520. Processor 520 may be configured to execute computer-readable instructions stored in a memory to perform various functions (e.g., functions or tasks supporting predicate based data deletion).

Memory 525 may include random access memory (RAM) and read only memory (ROM). The memory 525 may store computer-readable, computer-executable software 530 including instructions that, when executed, cause the processor to perform various functions described herein. In some cases, the memory 525 may contain, among other things, a basic input/output system (BIOS) which may control basic hardware and/or software operation such as the interaction with peripheral components or devices.

Database controller 530 may manage data storage and processing in database 535. In some cases, a user may interact with database controller 530. In other cases, database controller 530 may operate automatically without user interaction. Database 535 may be an example of a single database, a distributed database, multiple distributed databases, or an emergency backup database.

I/O controller 540 may manage input and output signals for device 505. I/O controller 540 may also manage peripherals not integrated into device 505. In some cases, I/O controller 540 may represent a physical connection or port to an external peripheral. In some cases, I/O controller 540 may utilize an operating system such as iOS®, ANDROID®, MS-DOS®, MS-WINDOWS®, OS/2®, UNIX®, LINUX®, or another known operating system. In other cases, I/O controller 540 may represent or interact with a modem, a keyboard, a mouse, a touchscreen, or a similar device. In some cases, I/O controller 540 may be implemented as part of a processor. In some cases, a user may interact with device 505 via I/O controller 540 or via hardware components controlled by I/O controller 540.

Figure 6:
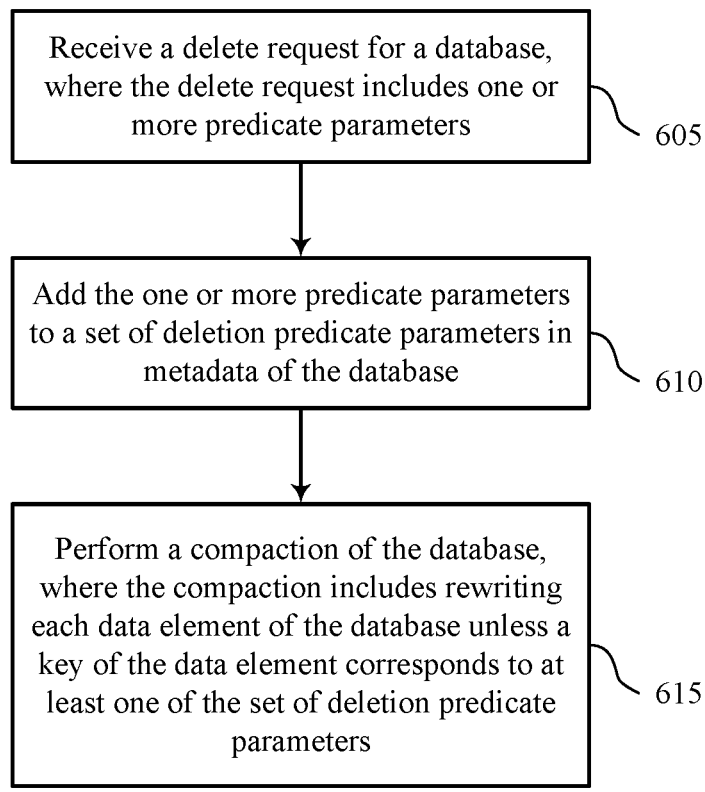
FIGS. 6 through 9 illustrate methods for predicate based data deletion in accordance with aspects of the present disclosure.

FIG. 6 shows a flowchart illustrating a method 600 for predicate based data deletion in accordance with various aspects of the present disclosure. The operations of method 600 may be implemented by a data deletion manager or its components as described herein. For example, the operations of method 600 may be performed by a data deletion manager 315, 415, or 515 as described with reference to FIGS. 3 through 5. In some examples, a data deletion manager may execute a set of codes to control the functional elements of the device to perform the functions described below. Additionally or alternatively, the data deletion manager may perform aspects of the functions described below using special-purpose hardware.

At block 605 the data deletion manager 315, 415, or 515 may receive a delete request for a database, wherein the delete request comprises one or more predicate parameters. The one or more predicate parameters may include an organization identifier, a data size identifier, a data owner identifier, a version identifier, or a combination thereof. The operations of block 605 may be performed according to the methods described with reference to FIGS. 1 and 2. In certain examples, aspects of the operations of block 605 may be performed by a predicate deletion component as described with reference to FIGS. 3 through 5.

At block 610 the data deletion manager 315, 415, or 515 may add the one or more predicate parameters to a set of deletion predicate parameters in metadata of the database. The operations of block 610 may be performed according to the methods described with reference to FIGS. 1 and 2. In certain examples, aspects of the operations of block 610 may be performed by a predicate deletion component as described with reference to FIGS. 3 through 5.

At block 615 the data deletion manager 315, 415, or 515 may perform a compaction of the database, wherein the compaction comprises rewriting each data element of the database unless a key of the data element corresponds to at least one of the set of deletion predicate parameters. The operations of block 615 may be performed according to the methods described with reference to FIGS. 1 and 2. In certain examples, aspects of the operations of block 615 may be performed by a compaction component as described with reference to FIGS. 3 through 5.

Figure 7:
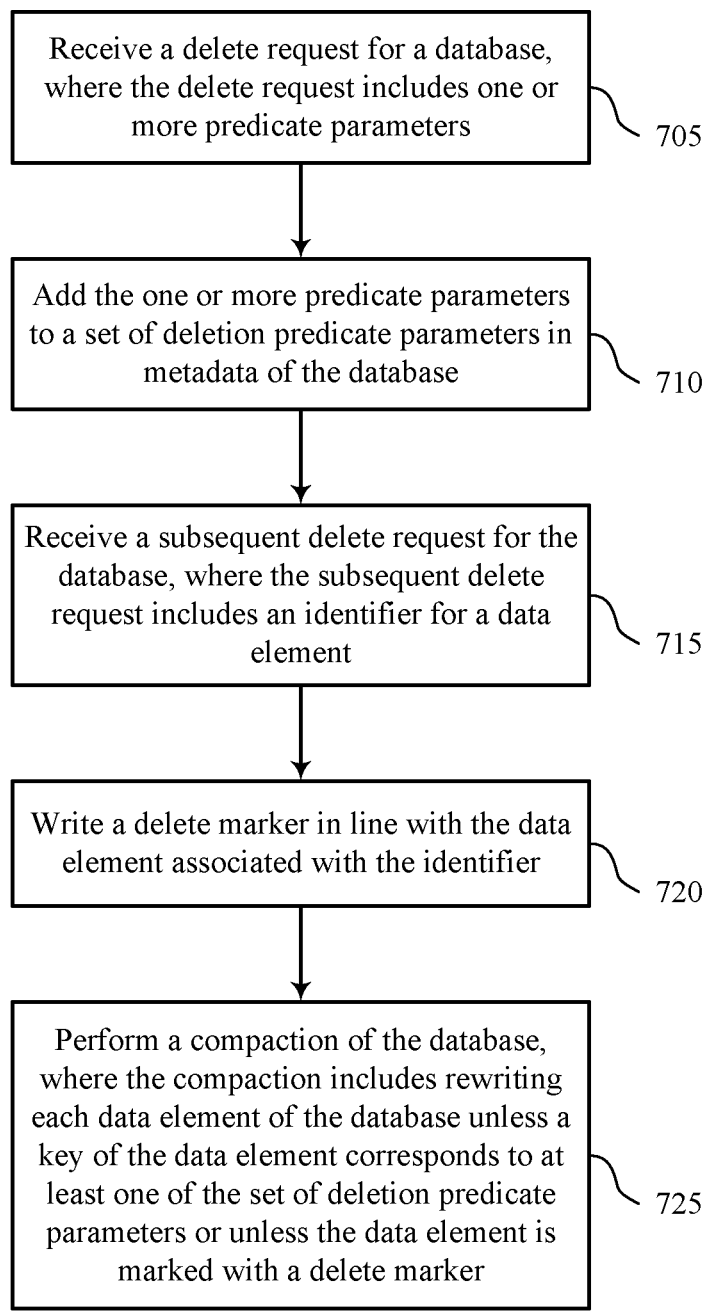

FIG. 7 shows a flowchart illustrating a method 700 for predicate based data deletion in accordance with various aspects of the present disclosure. The operations of method 700 may be implemented by a data deletion manager or its components as described herein. For example, the operations of method 700 may be performed by a data deletion manager 315, 415, or 515 as described with reference to FIGS. 3 through 5. In some examples, a data deletion manager may execute a set of codes to control the functional elements of the device to perform the functions described below. Additionally or alternatively, the data deletion manager may perform aspects of the functions described below using special-purpose hardware.

At block 705 the data deletion manager 315, 415, or 515 may receive a delete request for a database, wherein the delete request comprises one or more predicate parameters. The operations of block 705 may be performed according to the methods described with reference to FIGS. 1 and 2. In certain examples, aspects of the operations of block 705 may be performed by a predicate deletion component as described with reference to FIGS. 3 through 5.

At block 710 the data deletion manager 315, 415, or 515 may add the one or more predicate parameters to a set of deletion predicate parameters in metadata of the database. The operations of block 710 may be performed according to the methods described with reference to FIGS. 1 and 2. In certain examples, aspects of the operations of block 710 may be performed by a predicate deletion component as described with reference to FIGS. 3 through 5.

At block 715 the data deletion manager 315, 415, or 515 may receive a subsequent delete request for the database, wherein the subsequent delete request comprises an identifier for a data element. The operations of block 715 may be performed according to the methods described with reference to FIGS. 1 and 2. In certain examples, aspects of the operations of block 715 may be performed by a marker deletion component as described with reference to FIGS. 3 through 5.

At block 720 the data deletion manager 315, 415, or 515 may write a delete marker in line with the data element associated with the identifier. The operations of block 720 may be performed according to the methods described with reference to FIGS. 1 and 2. In certain examples, aspects of the operations of block 720 may be performed by a marker deletion component as described with reference to FIGS. 3 through 5.

At block 725 the data deletion manager 315, 415, or 515 may perform a compaction of the database, wherein the compaction comprises rewriting each data element of the database unless a key of the data element corresponds to at least one of the set of deletion predicate parameters or unless the data element is marked with a delete marker. The operations of block 725 may be performed according to the methods described with reference to FIGS. 1 and 2. In certain examples, aspects of the operations of block 725 may be performed by a compaction component as described with reference to FIGS. 3 through 5.

Figure 8:
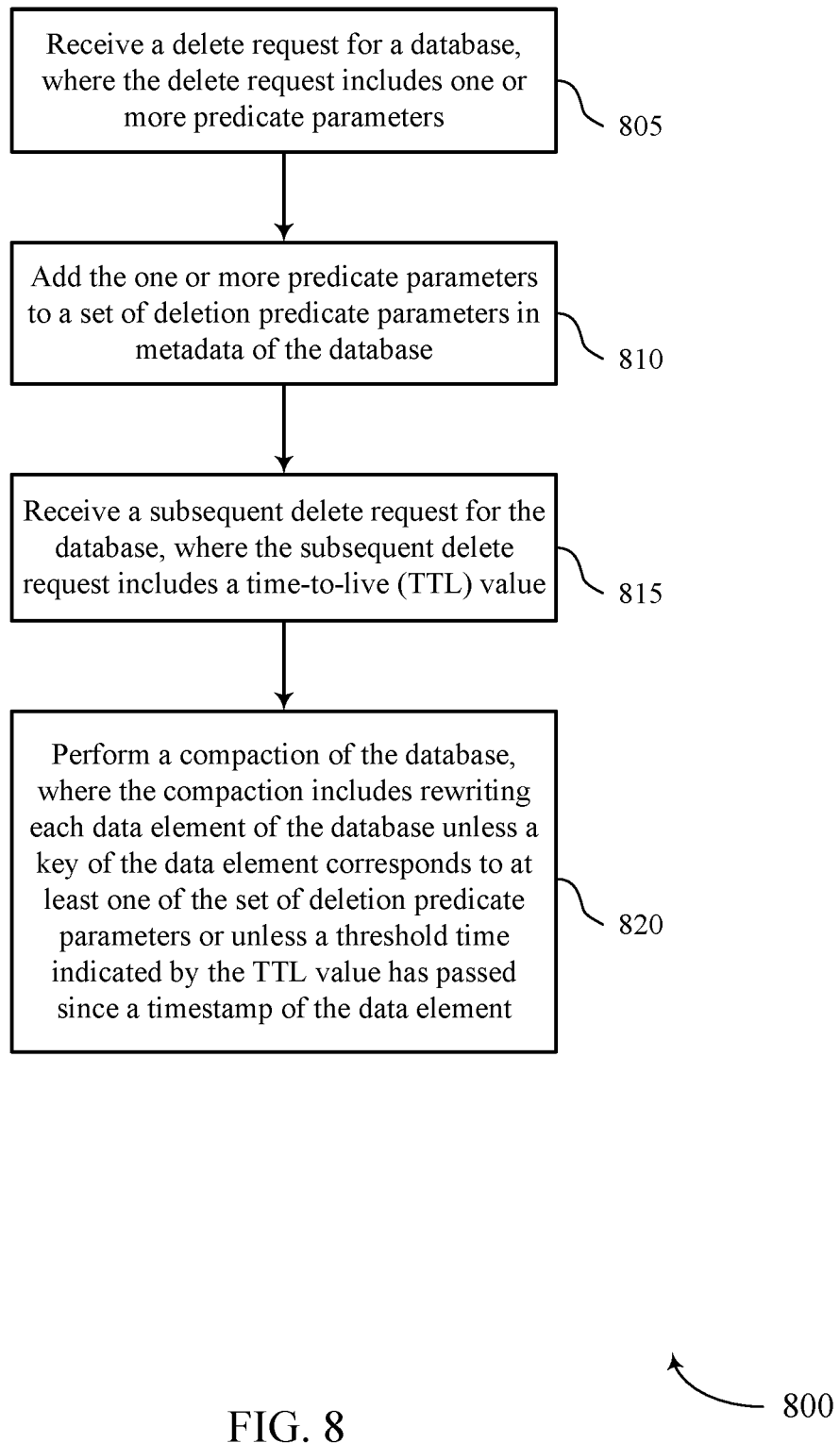

FIG. 8 shows a flowchart illustrating a method 800 for predicate based data deletion in accordance with various aspects of the present disclosure. The operations of method 800 may be implemented by a data deletion manager or its components as described herein. For example, the operations of method 800 may be performed by a data deletion manager 315, 415, or 515 as described with reference to FIGS. 3 through 5. In some examples, a data deletion manager may execute a set of codes to control the functional elements of the device to perform the functions described below. Additionally or alternatively, the data deletion manager may perform aspects of the functions described below using special-purpose hardware.

At block 805 the data deletion manager 315, 415, or 515 may receive a delete request for a database, wherein the delete request comprises one or more predicate parameters. The operations of block 805 may be performed according to the methods described with reference to FIGS. 1 and 2. In certain examples, aspects of the operations of block 805 may be performed by a predicate deletion component as described with reference to FIGS. 3 through 5.

At block 810 the data deletion manager 315, 415, or 515 may add the one or more predicate parameters to a set of deletion predicate parameters in metadata of the database. The operations of block 810 may be performed according to the methods described with reference to FIGS. 1 and 2. In certain examples, aspects of the operations of block 810 may be performed by a predicate deletion component as described with reference to FIGS. 3 through 5.

At block 815 the data deletion manager 315, 415, or 515 may receive a subsequent delete request for the database, wherein the subsequent delete request comprises a TTL value. The operations of block 815 may be performed according to the methods described with reference to FIGS. 1 and 2. In certain examples, aspects of the operations of block 815 may be performed by a TTL deletion component as described with reference to FIGS. 3 through 5.

At block 820 the data deletion manager 315, 415, or 515 may perform a compaction of the database, wherein the compaction comprises rewriting each data element of the database unless a key of the data element corresponds to at least one of the set of deletion predicate parameters or unless a threshold time indicated by the TTL value has passed since a timestamp of the data element. The operations of block 820 may be performed according to the methods described with reference to FIGS. 1 and 2. In certain examples, aspects of the operations of block 820 may be performed by a compaction component as described with reference to FIGS. 3 through 5.

Figure 9:
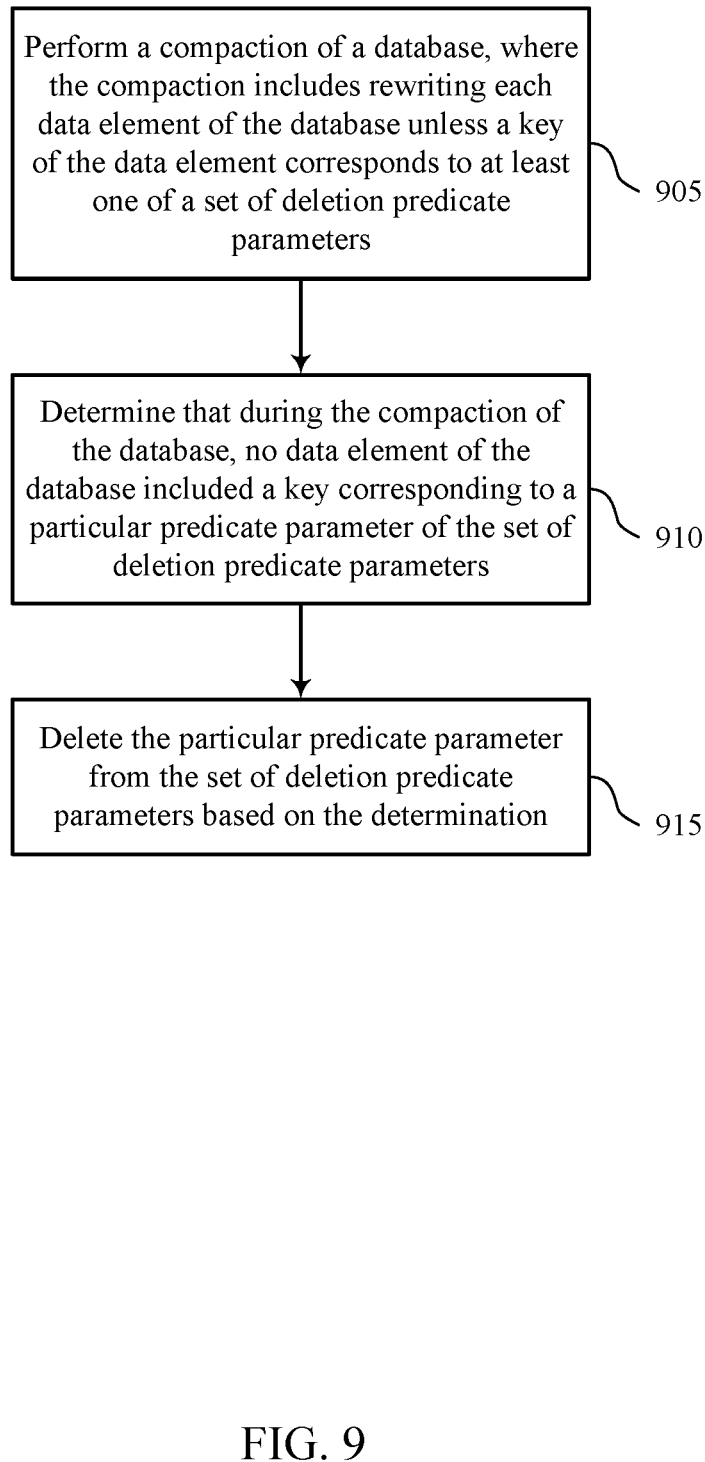

FIG. 9 shows a flowchart illustrating a method 900 for predicate based data deletion in accordance with various aspects of the present disclosure. The operations of method 900 may be implemented by a data deletion manager or its components as described herein. For example, the operations of method 900 may be performed by a data deletion manager 315, 415, or 515 as described with reference to FIGS. 3 through 5. In some examples, a data deletion manager may execute a set of codes to control the functional elements of the device to perform the functions described below. Additionally or alternatively, the data deletion manager may perform aspects of the functions described below using special-purpose hardware.

At block 905 the data deletion manager 315, 415, or 515 may perform a compaction of a database, where the compaction includes rewriting each data element of the database unless a key of the data element corresponds to at least one of a set of deletion predicate parameters. In some cases, the a data element may not be rewritten based on a delete marker or a TTL value. The operations of block 905 may be performed according to the methods described with reference to FIGS. 1 and 2. In certain examples, aspects of the operations of block 905 may be performed by a compaction component as described with reference to FIGS. 3 through 5.

At block 910 the data deletion manager 315, 415, or 515 may determine that during the compaction of the database, no data element of the database included a key corresponding to a particular predicate parameter of the set of deletion predicate parameters. For example, in a previous compaction of the database, the database may have refrained from rewriting each data element including a key corresponding to the particular predicate parameter. During or following the previous compaction, the database may have overwritten each data element including a key corresponding to the particular predicate parameter with other data elements. The operations of block 910 may be performed according to the methods described with reference to FIGS. 1 and 2. In certain examples, aspects of the operations of block 910 may be performed by a predicate deletion component as described with reference to FIGS. 3 through 5.

At block 915 the data deletion manager 315, 415, or 515 may delete the particular predicate parameter from the set of deletion predicate parameters based on the determination. In other cases, the database may keep the particular predicate parameter in the set of deletion predicate parameters (e.g., if the database may receive data with the particular predicate parameter in the future). In some cases, a user may select whether to delete a predicate parameter once all data elements with keys corresponding to the predicate parameter are overwritten from the database. The operations of block 915 may be performed according to the methods described with reference to FIGS. 1 and 2. In certain examples, aspects of the operations of block 915 may be performed by a predicate deletion component as described with reference to FIGS. 3 through 5.

A method of data storage is described. The method may include receiving a delete request for a database, wherein the delete request comprises one or more predicate parameters, adding the one or more predicate parameters to a set of deletion predicate parameters in metadata of the database, and performing a compaction of the database, wherein the compaction comprises rewriting each data element of the database unless a key of the data element corresponds to at least one of the set of deletion predicate parameters.

Another apparatus for data storage is described. The apparatus may include a processor, memory in electronic communication with the processor, and instructions stored in the memory. The instructions may be operable to cause the processor to receive a delete request for a database, wherein the delete request comprises one or more predicate parameters, add the one or more predicate parameters to a set of deletion predicate parameters in metadata of the database, and perform a compaction of the database, wherein the compaction comprises rewriting each data element of the database unless a key of the data element corresponds to at least one of the set of deletion predicate parameters.

A non-transitory computer readable medium for data storage is described. The non-transitory computer-readable medium may include instructions operable to cause a processor to receive a delete request for a database, wherein the delete request comprises one or more predicate parameters, add the one or more predicate parameters to a set of deletion predicate parameters in metadata of the database, and perform a compaction of the database, wherein the compaction comprises rewriting each data element of the database unless a key of the data element corresponds to at least one of the set of deletion predicate parameters.

In some examples of the method, apparatus, and non-transitory computer-readable medium described above, the compaction comprises rewriting each data element of the database unless a key of the data element corresponds to at least one of the set of deletion predicate parameters, unless the data element may be marked with a delete marker, or unless a threshold time indicated by a TTL value may have passed since a timestamp of the data element.

Some examples of the method, apparatus, and non-transitory computer-readable medium described above may further include processes, features, means, or instructions for receiving a subsequent delete request for the database, wherein the subsequent delete request comprises an identifier for a data element. Some examples of the method, apparatus, and non-transitory computer-readable medium described above may further include processes, features, means, or instructions for writing a delete marker in line with the data element associated with the identifier.

Some examples of the method, apparatus, and non-transitory computer-readable medium described above may further include processes, features, means, or instructions for refraining from writing a delete marker for the delete request based at least in part on the delete request comprising the one or more predicate parameters.

Some examples of the method, apparatus, and non-transitory computer-readable medium described above may further include processes, features, means, or instructions for receiving a subsequent delete request for the database, wherein the subsequent delete request comprises a TTL value.

In some examples of the method, apparatus, and non-transitory computer-readable medium described above, the one or more predicate parameters corresponds to a data element in the database at the time the data element may be initially written to the database.

In some examples of the method, apparatus, and non-transitory computer-readable medium described above, each of the one or more predicate parameters may be associated with a plurality of data elements of the database.

In some examples of the method, apparatus, and non-transitory computer-readable medium described above, the one or more predicate parameters consist of an organization identifier, a data size identifier, a data owner identifier, a version identifier, or a combination thereof.

In some examples of the method, apparatus, and non-transitory computer-readable medium described above, the database may be structured in a log-structured merge-tree format.

In some examples of the method, apparatus, and non-transitory computer-readable medium described above, the database comprises a WAL database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data storage, comprising:
   receiving a delete request for a database, wherein the delete request comprises a predicate parameter corresponding to a plurality of data rows in the database;
   adding the predicate parameter to a set of deletion predicate parameters stored at the database as metadata;
   performing a compaction of the database based at least in part on the set of deletion predicate parameters stored at the database as metadata, the compaction comprising:
      identifying that each data row of the plurality of data rows comprise a key associated with a common predicate parameter, wherein the key of each data row is associated with the common predicate parameter at the time each data row is initially written to the database;
      determining that the common predicate parameter is included in the set of deletion predicate parameters stored at the database as metadata; and
      rewriting each data row of the remaining data rows of the database based at least in part on the determining; and
   overwriting each data row of the plurality of data rows comprising the key associated with the common predicate parameter during the compaction, following the compaction, or a combination thereof.

2. The method of claim 1, wherein the compaction comprises rewriting each data row of the database unless the key of the data row corresponds to at least one of the set of deletion predicate parameters, unless the data row is marked with a delete marker, or unless a threshold time indicated by a time-to-live (TTL) value has passed since a timestamp of the data row.

3. The method of claim 1, further comprising:
   receiving a subsequent delete request for the database, wherein the subsequent delete request comprises an identifier for a data row; and
   writing a delete marker for the subsequent delete request in line with the data row associated with the identifier.

4. The method of claim 3, further comprising:
   refraining from writing a delete marker for the delete request based at least in part on the delete request comprising the predicate parameter.

5. The method of claim 1, further comprising:
   receiving a subsequent delete request for the database, wherein the subsequent delete request comprises a TTL value.

6. The method of claim 1, wherein the respective predicate parameter corresponds to the data row in the database at the time the data row is initially written to the database.

7. The method of claim 1, wherein the predicate parameter comprises an organization identifier, a data size identifier, a data owner identifier, a version identifier, or a combination thereof.

8. The method of claim 1, wherein the database is structured in a log-structured merge-tree format.

9. The method of claim 1, wherein the database comprises a write-ahead logging (WAL) database.

10. An apparatus for data storage, in a system comprising:
    a processor;
    memory in electronic communication with the processor; and
    instructions stored in the memory and operable, when executed by the processor, to cause the apparatus to:

receive a delete request for a database, wherein the delete request comprises a predicate parameter corresponding to a plurality of data rows in the database;

add the predicate parameter to a set of deletion predicate parameters stored at the database as metadata;

perform a compaction of the database based at least in part on the set of deletion predicate parameters stored at the database as metadata, the compaction comprising:

identifying that each data row of the plurality of data rows comprise a key associated with a common predicate parameter, wherein the key of each data row is associated with the common predicate parameter at the time each data row is initially written to the database;

determining that the common predicate parameter is included in the set of deletion predicate parameters stored at the database as metadata; and rewriting each data row of the remaining data rows of the database based at least in part on the determining; and overwrite each data row of the plurality of data rows comprising the key associated with the common predicate parameter during the compaction, following the compaction, or a combination thereof.

11. The apparatus of claim 10, wherein the compaction comprises rewriting each data row of the database unless the key of the data row corresponds to at least one of the set of deletion predicate parameters, unless the data row is marked with a delete marker, or unless a threshold time indicated by a time-to-live (TTL) value has passed since a timestamp of the data row.

12. The apparatus of claim 10, wherein the instructions are further executable by the processor to:

receive a subsequent delete request for the database, wherein the subsequent delete request comprises an identifier for a data row; and write a delete marker for the subsequent delete request in line with the data row associated with the identifier.

13. The apparatus of claim 12, wherein the instructions are further executable by the processor to:

refrain from writing a delete marker for the delete request based at least in part on the delete request comprising the predicate parameter.

14. The apparatus of claim 10, wherein the instructions are further executable by the processor to:

receive a subsequent delete request for the database, wherein the subsequent delete request comprises a TTL value.

15. A non-transitory computer readable medium storing code for data storage, the code comprising instructions executable by a processor to:

receive a delete request for a database, wherein the delete request comprises a predicate parameter corresponding to a plurality of data rows in the database;

add the predicate parameter to a set of deletion predicate parameters stored at the database as metadata;

perform a compaction of the database based at least in part on the set of deletion predicate parameters stored at the database as metadata, the compaction comprising:

identifying that each data row of the plurality of data rows comprise a key associated with a common predicate parameter, wherein the key of each data row is associated with the common predicate parameter at the time each data row is initially written to the database;

determining that the common predicate parameter is included in the set of deletion predicate parameters stored at the database as metadata; and rewriting each data row of the remaining data rows of the database based at least in part on the determining; and overwrite each data row of the plurality of data rows comprising the key associated with the common predicate parameter during the compaction, following the compaction, or a combination thereof.

16. The non-transitory computer-readable medium of claim 15, wherein the compaction comprises rewriting each data row of the database unless the key of the data row corresponds to at least one of the set of deletion predicate parameters, unless the data row is marked with a delete marker, or unless a threshold time indicated by a time-to-live (TTL) value has passed since a timestamp of the data row.

17. The non-transitory computer-readable medium of claim 15, wherein the instructions are further executable by the processor to:

receive a subsequent delete request for the database, wherein the subsequent delete request comprises an identifier for a data row; and write a delete marker for the subsequent delete request in line with the data row associated with the identifier.

18. The non-transitory computer-readable medium of claim 17, wherein the instructions are further executable by the processor to:

refrain from writing a delete marker for the delete request based at least in part on the delete request comprising the predicate parameter.

19. The non-transitory computer-readable medium of claim 15, wherein the instructions are further executable by the processor to:

receive a subsequent delete request for the database, wherein the subsequent delete request comprises a TTL value.

* * * * *